Dec. 28, 1937.   R. MIOLLIS   2,103,545
APPARATUS FOR MAKING CHEESE
Filed May 11, 1935   5 Sheets-Sheet 1

Inventor
Raymond Miollis

Dec. 28, 1937.   R. MIOLLIS   2,103,545
APPARATUS FOR MAKING CHEESE
Filed May 11, 1935   5 Sheets-Sheet 3

Inventor,
Raymond Miollis
Offield Mehlhope Scott & Poole
Attys.

Witness:

Dec. 28, 1937.   R. MIOLLIS   2,103,545
APPARATUS FOR MAKING CHEESE
Filed May 11, 1935   5 Sheets-Sheet 5

Patented Dec. 28, 1937

2,103,545

UNITED STATES PATENT OFFICE 2,103,545

APPARATUS FOR MAKING CHEESE

Raymond Miollis, Barron, Wis.

Application May 11, 1935, Serial No. 21,007

11 Claims. (Cl. 31—46)

This invention relates to improvements in apparatus for cheese-making, and has for its principal object to provide a new and improved type of apparatus for making a natural cheese so that it can be cut economically into commercial package sizes, and particularly in rectangular forms of substantially uniform size and weight.

The present invention relates particularly to improvements in the apparatus for making natural cheese in package form as distinguished from the so-called "Processed cheese". Numerous efforts have been made to pack natural cheeses in small units of commercial size, having uniform weight and shape, but such efforts have failed, due to the difficulty in providing uniform control of the size and weight of relatively small blocks of cheese during the whey-drainage operation. Moreover, the ordinary methods of manufacture of relatively small natural cheeses involves comparatively large losses, due to the large proportion of rind to the edible cheese, when natural cheese is made in relatively small blocks.

While this problem of making cheese in small packages of uniform size has been partially solved by the processing method in which the entire mass of cheese is poured into containers in molten form, yet many consumers prefer natural cheeses unaffected by heat and chemicals used for devitalizing "processed" cheese, with the result that natural cheeses usually command considerably higher prices than processed cheeses.

In a prior application bearing Serial No. 727,023, filed May 23, 1934, now Patent No. 2,025,213, dated December 24, 1935, I have disclosed and claimed a method and apparatus which have been successfully employed in the making of natural cheeses, but which are especially directed to the formation of the cheese in round bricks or wheels. The present invention is more particularly directed to improved apparatus for handling and forming the cheese in rectangular package form, for the purpose of the economical production of natural cheese, so that it can be finally produced in relatively small portions of uniform weight and size.

Among other objects of the invention is to reduce the shrinkage in the curing room, to reduce the amount of rind on the cheese in its final package form, and yet leaving sufficient rind along at least one edge or side of each individual portion, so as to give the consumer a visual proof that it is a natural cheese, and provide proper ventilation of the cheese, when desired.

In carrying out my invention, I provide an improved form of apparatus adapted for handling batches of 10,000 pounds of milk more or less, to be made into individual commercial size packages of uniform shape and weight as small as a few ounces each. Said apparatus includes as its principal elements a cheese vat, a molding vat, cheese molds and a cheese press. The cheese vat may be similar to the ordinary cheese vats in which the usual curd-forming and draining processes are carried out, but it is also provided with improved means for initially removing the whey from the vat. The molding vat is of novel form and utility in my improved process. It is provided with special means for further pressing and draining the whey from the batch and for cutting the batch into relatively large rectangular blocks of uniform size, extending the full width of the molding vat. The cheese molds are provided for receiving and forming these long blocks in final compact form of uniform shape and size while under pressure, in a cheese press specially designed to maintain the cross-sectional area of all of the blocks uniform throughout their length. After being removed from the cheese press, the cheese blocks are then in condition for curing and final cutting and packing into relatively small individual portions of uniform commercial size, shape and weight, with minimum losses from shrinkage in the curing room, and from removal of rind.

The invention may best be understood by reference to the accompanying drawings, in which.

Figures 1, 2:
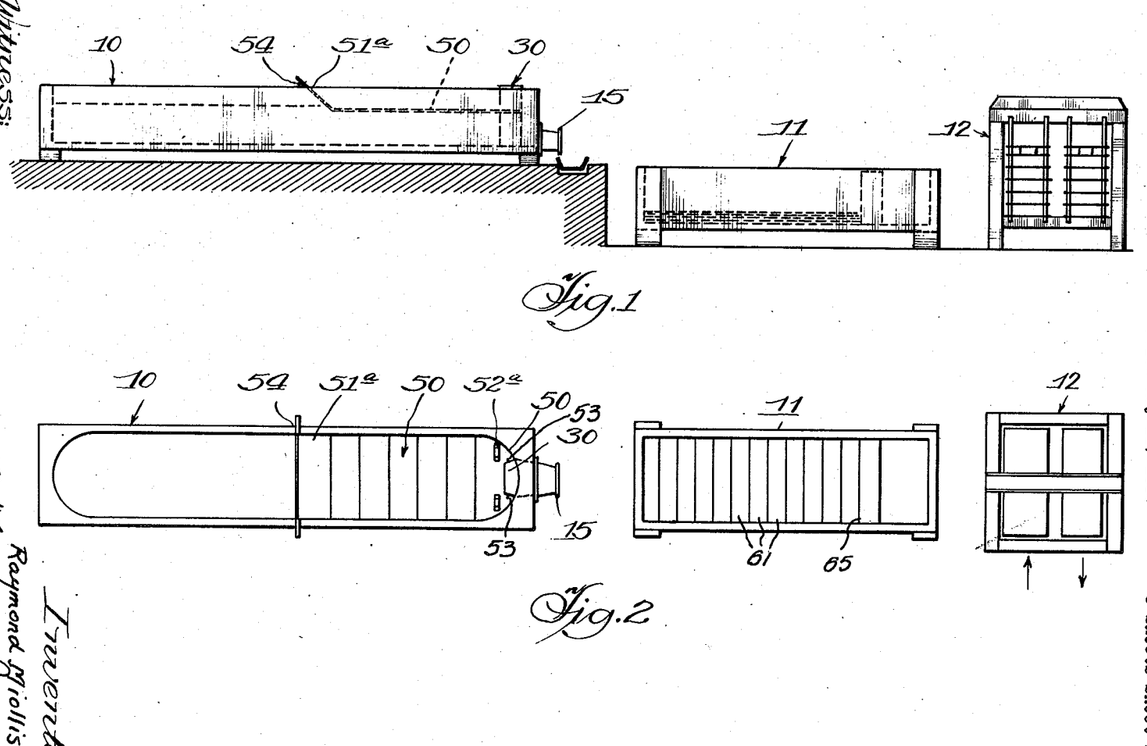
Figure 1 is a side view of the main elements of my improved apparatus including the cheese vat, molding vat and cheese press.
Figure 2 is a plan view of the elements shown in Figure 1.

Referring now to the details of the apparatus shown in the drawings, the cheese vat indicated generally at 10 in Figures 1 and 2 may be of the usual form heretofore employed in making natural cheeses and adapted to receive milk or cream in large quantities to be treated bacteriologically in the usual manner, depending upon the nature or type of cheese to be made. It will be understood that with older methods of natural cheesemaking, most of the operations—including the initial draining, initial matting or pressing of the curds, and the cutting of the batch into substantially square individual blocks—were all carried on within the cheese vat itself. In the present invention, I utilize the cheese vat only for mixing and forming the curds and initially draining the whey from the curds, after which the batch is transferred to a separate molding vat, where it is further pressed and formed into elongated blocks of uniform size and weight, as will hereinafter more fully appear.

Figures 3, 4, 5, 6, 7, 8, 9:
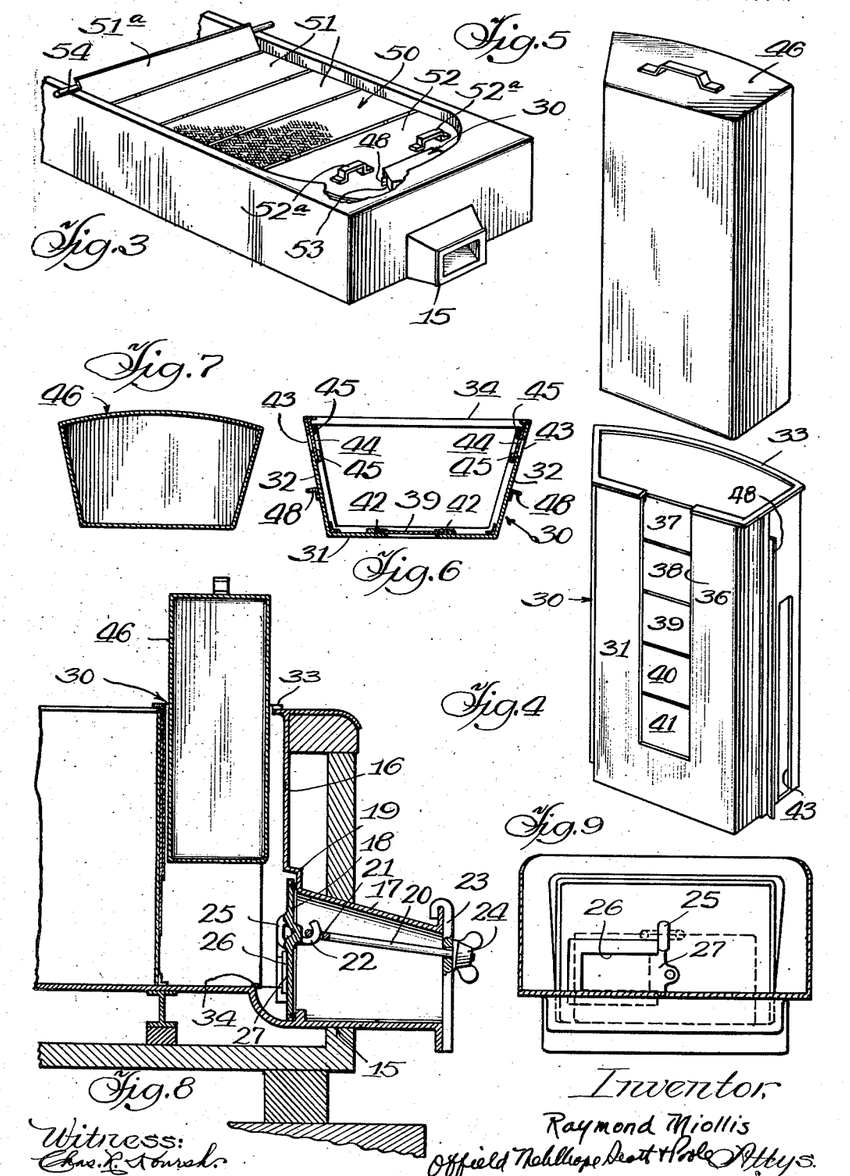
Figure 3 is a perspective view showing the discharge end of the cheese vat, with the top screen and whey strainer applied thereto.
Figure 4 is an enlarged perspective view of the whey strainer.
Figure 5 is a perspective view of the hollow drum used in connection with the whey strainer.
Figure 6 is a horizontal detail section of the whey strainer shown in Figure 4.
Figure 7 is a horizontal detail section of the hollow drum shown in Figure 5.
Figure 8 is an enlarged detail section taken longitudinally of the cheese vat at its discharge end and showing the drainage frame applied thereto, and with the hollow drum partially removed from the latter.
Figure 9 is an end view of the discharge housing mounted on the shell of the cheese vat.

Certain novel features of the cheese vat, shown in Figures 3 to 9, may be described as follows:

The vat shown herein is formed of a wood frame 13, having a metal inner lining 16. A discharge spout 15, large enough to permit the batch of curds to be readily discharged into the molding vat, is connected at one end of the vat, and herein is formed integral with the metal inner lining, as shown in Figure 8. Said spout comprises an elongated hollow casing 17 extending through the end wall of the frame 13, and generally rectangular in cross section. A removable gate or closure 18 is fitted against a shoulder 19 formed near the inner end of said casing. The gate 18 is secured in place by means of a tie rod 20 having an eye 21 at its inner end engaging a hook 22 and having its outer end extending through a detachable upright bar 23, adapted to span the outer end of the casing 17. The outer end of the tie rod has a wing nut 24 threaded thereon to engage the outer face of the bar 23, all as clearly shown in Figures 8 and 9. When the tie rod 20 and bar 23 are detached and removed from the casing 17, the plate 18 may be removed inwardly by reaching downwardly from the interior of the cheese vat and into the spout 15 where the plate 18 may be engaged by means of a projecting handle 25 on the inner side thereof.

The plate 18 is also provided with an auxiliary opening 26, normally closed by a sliding plate 27, but arranged so that said plate may be opened to permit drainage of whey from the vat without removing the entire plate 18.

Means are provided for assisting in the initial drainage of whey from the batch of curds in the cheese vat in the following manner:

A whey strainer 30 is formed of sheet metal, having open top, bottom and rear faces, but with its front face 31 and flaring side faces 32, 32 forming upright walls. The rearmost or flared margins of the upright walls 32, 32 are cross-connected by a curved brace 33 at the upper edge of the frame, and a relatively straight cross brace 34 at the lower edge thereof. In a central portion of the front face 31 I provide a notched-out slot 36 extending to the upper edge of the frame, adapted to be closed by a series of endwise abutting plates 37, 38, 39, 40 and 41, which are removable from the slot 36 by sliding them upwardly in guides 42, 42 arranged along the inner margins of said slot 36. A pair of somewhat narrower slots 43, 43 are also arranged in the outer walls 32 adjacent the wider margin of the frame, which slots extend to the bottom of the frame and are adapted to be closed by sliding plates 44, 44 secured in guides 45, 45, as is best seen in Figures 4 and 6.

In connection with the strainer 30, I also provide a hollow closed drum 46 which is shaped to fit into and substantially fill the strainer 30 but to be removable from the upper end thereof, as is clearly indicated in Figures 4, 5, and 8.

The purpose of this open whey strainer 30, together with the hollow drum 46, is as follows:

After the curds have been formed in the cheese vat 10 and it is desired to drain the whey from the batch, the drum 46 is placed in the open frame and the two parts are plunged in upright position into the batch at the end of the cheese vat immediately adjacent the discharge spout 15 so as to form in effect a closure for said discharge passage. When seated in proper position, the curved upper cross bar 33 conforms to the curvature of the end of the cheese vat, while the upright margins of the walls 32, 32 at their widest portion abut the curved upright end wall of the cheese vat at opposite sides of the discharge passage 15. The drum 46 is then withdrawn upwardly from the strainer 30 as indicated in Figure 8, leaving the interior of the frame open for the draining operation. The whey may then be drained from the top of the batch by withdrawing first the upper sliding plate 37 from the slot 36 on the inner face of the strainer 30, and then as the level of the curds becomes lower and lower, succeeding plates 38, 39 or 40 may be withdrawn as required.

In order to further expedite the drainage, I also provide a removable top screen 50, which is placed over the curds adjacent the discharge end of the vat so as to press downwardly on the curds and retain them while permitting the whey to escape from the top of the batch and drain through the strainer 30.

In the preferred form shown herein, the top screen 50 is formed of a plurality of similar sections 51, 51 extending transversely of the interior of the cheese vat, and an end plate 52 substantially semicircular in shape so as to closely fit within the curved end of the cheese vat, as clearly shown in Figure 3. The sections 51, 51 may be of wire mesh, or otherwise perforated, and are preferably hinged to each other and to the edge of the plate 52, as shown. The plate 52 is notched out at its curved end so as to fit around the upright walls 31 and 32 of the whey strainer 30. A pair of upright angle irons 48 are preferably attached to the side walls 32, 32 of the whey strainer 30, which angle irons project into grooves 53, 53 formed in the plate 52, with the result that the plate 52, together with the hinged sections 51, 51, may float vertically with respect to the whey strainer 30.

In operation, it will be understood that the top screen 50 rests upon the batch of curds, and the whey will tend to rise through the screen and flow over the plate 52 and through the open slot 36 of the whey strainer 30.

The free end of the top screen 50 may be suitably supported on the vat, as for instance by tilting the end section 51a upwardly on the cross bar 54 resting on the edges of said vat, as shown in Figures 1 and 3. When not in use, the sections 51 and 51a may be folded so as to rest upon the adjacent edge of the plate 52. A pair of handles 52a may also be provided on the upper edge of the plate 52 adjacent its rounded end so as to assist in handling the screen 50.

After the free whey has been drained from the batch through the top screen 50 a sufficient length of time, the batch may be further drained by removing said screen and scooping or trowelling out the batch along the sides of the cheese vat so as to form troughs or grooves leading to the slots 43, 43 at the sides of the whey strainer. The plates 44, 44 are then removed to permit an additional amount of whey to be drained along such grooves, and through the slots 43, 43.

It will be understood that during the drainage process above described, the whey passes through the whey strainer 30 and from thence through the discharge spout 15 and the opening 26 in the gate 18 of spout 15, from whence it may be carried away in a suitable trough, not shown.

The operation of initially draining the whey from the batch in the cheese vat is thus speeded up considerably.

After a sufficient amount of free whey has been drained from the batch, the whey strainer 30 may then be entirely removed from the cheese vat, and the batch is ready to be transferred to the molding vat.

The molding vat, indicated generally at 11 in Figures 1 and 2, consists of a rectangular receptacle of somewhat smaller capacity than the cheese vat 10 and arranged to receive the batch from said cheese vat after the whey has been initially drained therefrom.

Figure 10:
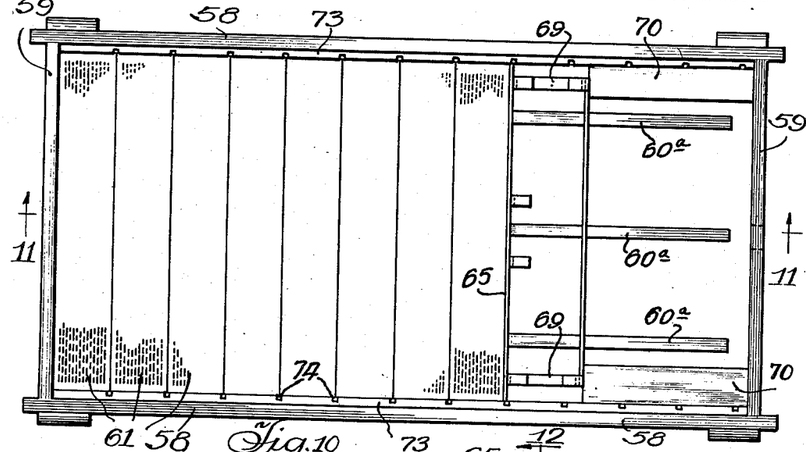
Figure 10 is a plan view of the molding vat showing the end plate and the cheese platforms therein.
Figure 11:
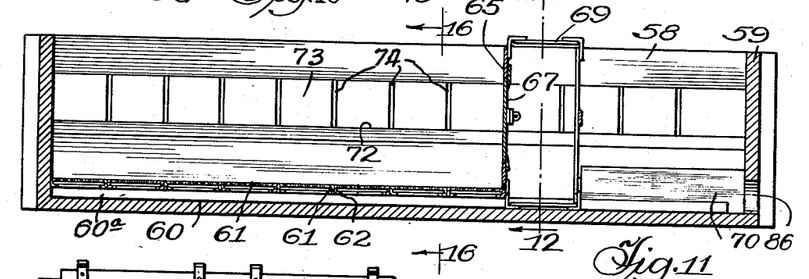
Figure 11 is a longitudinal section of the molding vat taken on line 11—11 of Figure 10.
Figure 12:
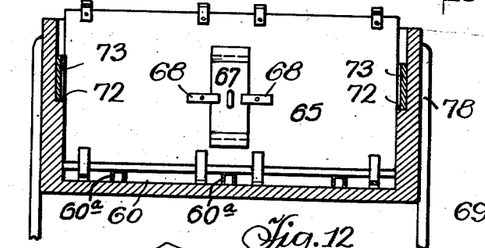
Figure 12 is a detail section taken on line 12—12 of Figure 11.
Figure 13:
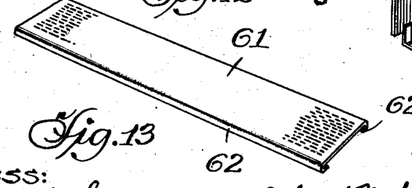
Figure 13 is a perspective detail of one of the individual cheese platforms used in the molding vat.

In the form shown in Figures 10 and 11, each molding vat has side walls 58, end walls 59 and an integral horizontal bottom 60, on which is disposed a plurality of removable platforms 61, 61 placed crosswise inside the molding vat. Each of these platforms has a suitable porous upper surface, herein provided by perforations, as indicated in Figure 13, and has flanged side margins 62, 62 which rest on suitable bars 60a, 60a disposed longitudinally of the vat bottom. The platforms 61 thus form, in effect, a permeable false bottom for the vat to permit drainage of whey from the bottom of the batch.

A removable end plate 65 also fits within one end of the vat abutting one end of the series of platforms, and is provided with a centrally disposed slot 66 through which the whey may be drained. The slot may be suitably closed by a plate 67 detachably secured to the exterior face of the end plate, as by pivoted lugs 68, 68 on the rear face of said end plate. The end plate has a pair of rectangular supporting frames 69 at its rear face, and is suitably held in place by a plurality of blocks 70, 70 inserted between the frame 69 and the adjacent end wall 59 of the vat, as shown in Figures 10 and 11.

Along each side wall 58 of the vat I provide a ledge or shoulder 72 disposed intermediate the top and bottom of the vat, which ledge is adapted to support a removable upright spacing board 73. Two similar spacing boards are provided along opposite sides of the vat. A plurality of upright grooves 74 are formed therein at equal distances along each of said boards. These grooves serve as spacing guides for the cheese knives shown in Figure 20, as will hereinafter more fully be described. It will be observed further that the positions of the several pairs of spacing grooves 74, 74 register with the abutting margins of each adjacent pair of platforms at the bottom of the vat.

After the batch of partially drained curds has been transferred from the cheese vat 10 into the molding vat, as by discharging said batch through a suitable trough (not shown), the batch is first subjected to a pressing operation by means of a large metal plate 80 which may be made up of several sections 80a, 80a assembled together in perfectly flat relation by means of reinforcing bars 81, 81 and longitudinal tie bars 81a, 81a. Said plate is of the same width as the vat, but its length depends upon the position of the end gate 65. The plate is normally suspended in horizontal position by means of suitable cables or chains 82, 82 connected to the tie bars 81a, and arranged so that said plate may be lowered bodily upon the top of the batch in the vat. When the batch is first placed in the molding vat, it still is in a sufficiently fluid state to settle with a perfectly level upper surface, and the plate is freed so as to rest by its own weight, on the batch, in parallel relation with the bottom of the vat at all times.

Figures 14, 15:
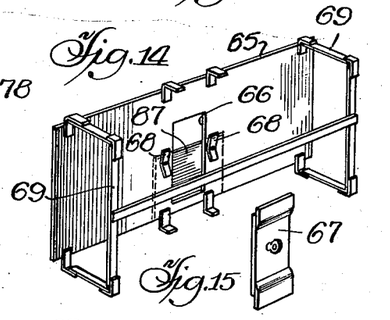
Figure 14 is a perspective view from the rear of the end frame also used in the molding vat.
Figure 15 is a detail perspective view of the removable gate with the end frame shown in Figure 14.

The plate 80 is preferably perforated as indicated at 85, 85 so as to permit the whey to escape upwardly through said plate as it presses upon the batch, and pass outwardly through the opening 66 in end gate 65. As a preferred means of maintaining the end face of the batch substantially smooth where its abuts the end gate 65, the cheesemaker will find it especially convenient to insert a relatively thin sheet of metal 87 over the opening 66 between the batch and the end gate 65, as indicated partly in dotted lines in Figure 15. Said sheet is arranged so its upper edge is substantially level with the top of the batch. The closure plate 67 may then be removed from the rear face of the end plate, leaving the slot 66 open for whey to drain therethrough. The whey may also escape through the perforated platforms 61 at the bottom of the vat, and from thence escape through a suitable discharge opening 86 at the end of the vat.

During the latter part of this pressing operation, the drainage of whey may be expedited by tilting the entire molding vat endwise toward the discharge end. As shown herein, such tilting is provided by a suitable frame jack shown in Figure 27 consisting of an open frame 76 having a notched bar 77 carrying a pair of hooks 77ª at its lower end for engaging the end of the vat. A lever 78 is pivoted to the frame and to the bar, and arranged so that the end of the vat can be tilted when desired.

Under most conditions the weight of the metal pressure plate 80 will be such as to produce the desired amount of pressure to press most of the whey from the batch, although, of course, it will be understood that additional pressure may be applied thereto by auxiliary means, if desired.

Figures 16, 17, 18, 19, 20, 21, 27:
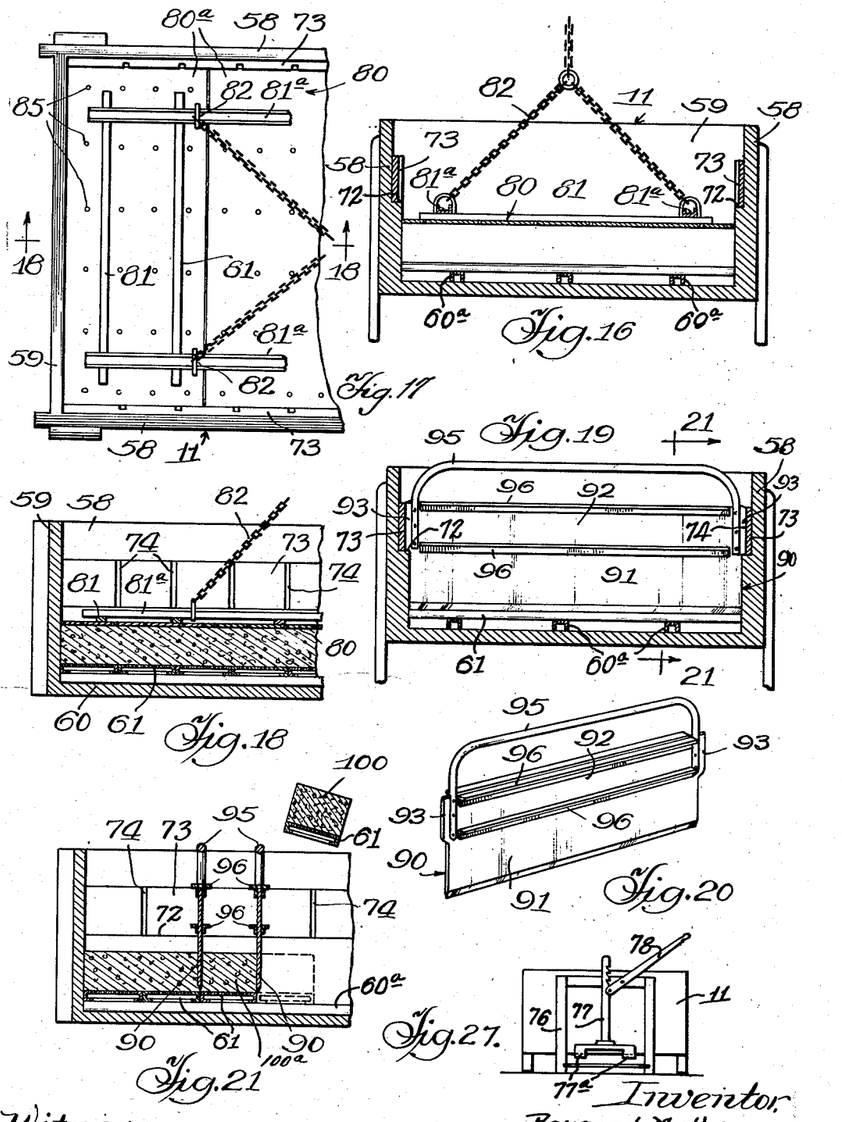
Figure 16 is a transverse section taken on line 16—16 of Figure 11, but showing the pressing plate applied to the top of a batch of cheese contained in the molding vat.
Figure 17 is a fragmentary plan view showing the molding vat with the pressing plate applied thereto.
Figure 18 is a detail section taken on line 18—18 of Figure 17.
Figure 19 is a detail section similar to Figure 16, but with the pressing plate removed and the cheese knife inserted in the molding vat for cutting blocks of cheese therein.
Figure 20 is a perspective view of one of the cheese knives removed from the molding vat.
Figure 21 is a longitudinal section taken on line 21—21 of Figure 19.
Figure 27 is a detail view of a frame jack used for tilting the molding vat.

The batch is preferably subjected to drainage under pressure, as described, until it is in a substantially semi-solid state, or at least having sufficient coherence or body that it can hold its shape while being cut into blocks and transferred into molding forms. When this stage is reached, the pressure plate 80 is removed, and the batch is then cut into elongated blocks by means of the cheese knives 90, 90, one of which is shown in Figure 20. Two such knives are used, each being as long as the vat is wide, and each of their blades 91 is slightly higher than the thickness of the mass of cheese to be cut. Above the blade 91 is a reinforcing plate 92 which includes extending ends 93, 93 which are adapted to fit into the spacing grooves 74, 74 formed in the boards 73, 73 at opposite sides of the molding vat, as previously described. Each cheese knife also has suitable handles or bails 95 and longitudinal reinforcing strips 96, 96.

The two cheese knives are operated in the following manner:

The first knife is placed in the first pair of spacing grooves 74 nearest the end plate 65 in the molding vat, and pressed downwardly so as to cut the first block of cheese from the batch. The end plate 65 is removed from the vat, and this first block 100 of cheese may then be raised on its separate bottom platform 61 and removed from the vat, as indicated in Figure 21. The first knife is left in the first groove, and the second knife is then placed in the second groove to cut the second block of cheese 100ª. The first knife may then be removed and placed immediately in the third groove to cut the third block of cheese. The second block of cheese may then be removed, with its respective platform 61, and placed in another mold. This operation is repeated until all the blocks of cheese have been cut, and removed from the vat.

Figures 22, 23, 24, 25, 26:
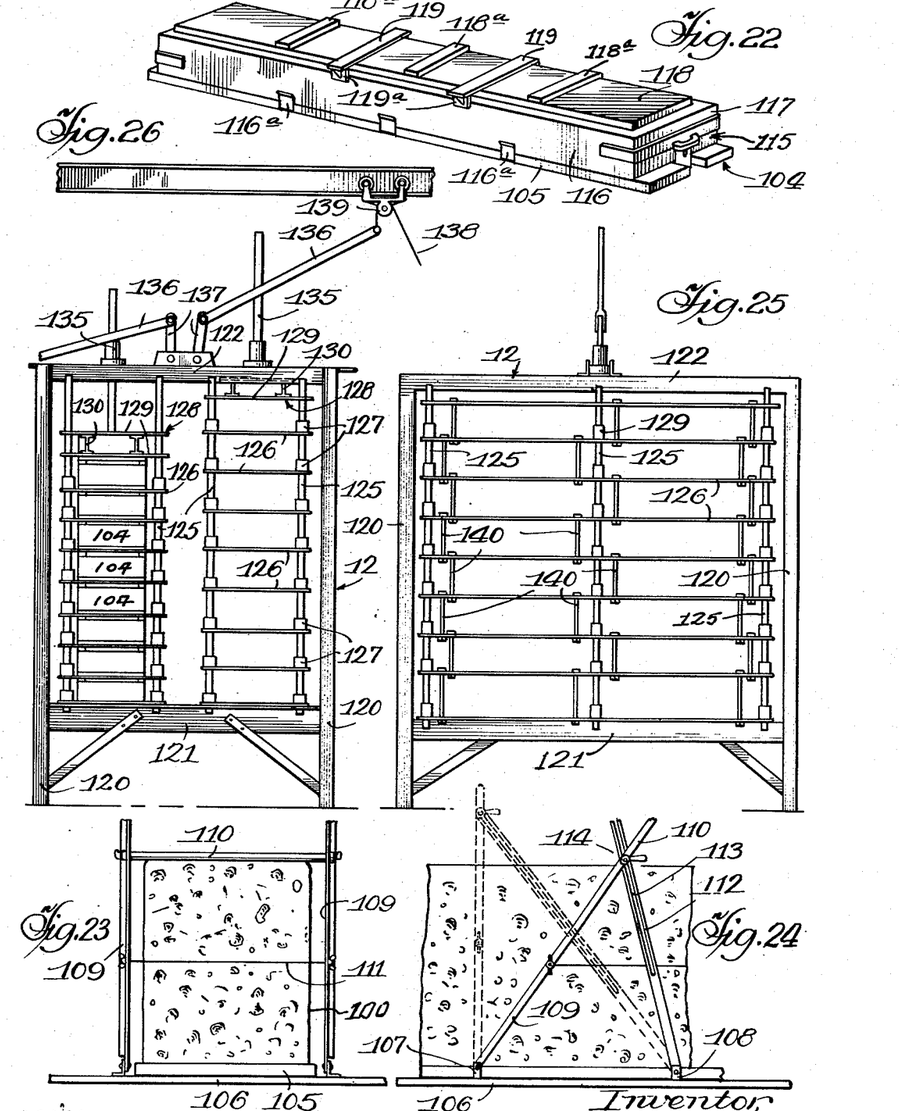
Figure 22 is a perspective view of a molding form in which the blocks are pressed.
Figure 23 is an end view of a cutting frame which may be utilized under certain conditions for separating each block into two blocks of equal size.
Figure 24 is a side view of the cutting frame shown in Figure 23.
Figure 25 is a side view of an improved form of cheese press especially adapted for pressing a plurality of blocks of cheese.
Figure 26 is an end view of the cheese press shown in Figure 25.

As the individual blocks 100 are removed from the molding vat, they may be either transferred directly to a mold 104 of the form illustrated in Figure 22, or may be cut horizontally into thinner slabs or blocks of equal size. Such a cutting operation is often desirable, because in practice the final pressing operation gives best results when the cheese is formed in slabs that are somewhat thin in the direction of application of pressure. Accordingly I provide an improved form of slicing device designed to cut an individual block of cheese into a plurality of horizontal layers or slabs of exactly equal size and shape, so that each such slab will have substantially less height than width before it is placed in its separate mold for the draining operation. This slicing device is illustrated in detail in Figures 23 and 24 and includes a base 106 having two pairs of brackets 107 and 108, each disposed at opposite sides of said base. A pair of arms 109, 109 are pivotally connected to the brackets 107 and have their free ends cross-connected by a cross-bar 110 so that said arms are maintained in upright parallel position with each other, but free to swing relative to the base 106. A wire 111 is connected between said arms at a point exactly equidistant between the lower pivotal axes of the arms 109 and the upper cross-bar 110, to form an open cutting frame, as is best seen in Figure 23.

A second pair of pivoted arms 112 extend upwardly from the brackets 108, 108 on the base 106 as clearly shown in Figure 24. The ends of cross-bar 110 are extended into slots 113 extending longitudinally of the arms 112, and are provided with wing nuts 114 threaded thereon. With this arrangement, the angle of inclination of the cutting arms 109, 109 carrying the cutting wire 111 may be varied within reasonable limits with respect to the base 109.

With the cutting device such as above described, a block of cheese 100 is placed on a suitable board 105 (which may be either the platform 61, or a separate board) of such thickness that its upper surface is level with the pivotal axes of arms 109, as clearly shown in Figures 23 and 24. The height of the cross-bar 110 is then adjusted along the supporting arms 112 so that the cross-bar just clears the top surface of the block of cheese. The cheese and its board are then slid along the base 106, with the result that the wire 111 cuts the block in a horizontal plane at the exact center thereof, thus separating the block into two halves of equal size and shape. The blocks thus separated are of suitable size and form to be placed in the mold box 104.

It will be understood, however, that the use of the cutting frame or device hereinabove described may be dispensed with where the blocks are initially made of proper size to be handled in the mold forms, or in other instances the cutting frame may be provided with two equispaced cutting wires so as to cut the blocks into three layers, as required.

Referring to Figure 22, the form of mold 104 illustrated includes a bottom board 105, a detachable open frame 115 having side walls 116 and end walls 117 and a top board 118. The side walls 116 are preferably flush with the margins of the bottom board 105, as shown, but the ends of the bottom board preferably project slightly beyond the end walls 117 to assist in handling the mold forms.

The block or slab of cheese (still of substantially the same length as the width of the molding vat) is transferred to the mold forms 104, and said forms are placed in drainage racks in a room at a suitable temperature and for the length of time to be determined by the cheesemaker, according to each type of cheese. During the draining process, the cheeses are turned over from time to time, the operation of turning being facilitated because a small number of relatively large mold forms are employed. The construction of the mold forms further facilitates the turning operations in the following manner: A spare bottom board 105 may be placed on the top of the mold frame 115 containing the cheese block; the entire apparatus, including the cheese, frame and two bottom boards, may then be turned over on the draining table or rack, and the bottom which previously was under the cheese block is then removed and placed on top of the next mold frame so as to form the new bottom of the latter, which is turned over in a similar manner.

When the time comes to put the cheese in the press, each cheese block may be turned over on top of a plain board, and the open frame is lifted and removed therefrom. The cheese block is then covered by cheesecloth and the frame is again placed around the cheese. A bottom board 105 is placed on top of the frame and the cheese is turned. The plain board is removed, the cheesecloth is then folded over the other surface of the cheese, and a top board 118 is then laid on top of the block, the arrangement being such that said top board fits snugly in the side and end walls 116, 117 respectively, of the open frame, and may be telescoped therein when subjected to pressure in the cheese press. Cross bars 118a may be secured to the upper surface of the top board, as shown, to increase the amplitude of telescoping movement of said top board while in the press.

Inasmuch as the mold form 104 is subjected to vertical pressures, means are also provided for retaining the side walls 116 against lateral displacement. In the form shown, this means consists of a plurality of cleats 116a, 116a connected to the lateral margins of the bottom board 105 and extending thereabove sufficiently to engage the outer surface of the side walls 116 at their lower margins. A pair of tie bars 119, 119 are also provided, each having a pair of longitudinally spaced cleats 119a, 119a adjacent opposite ends, which are of such distance as to engage the upper margins of the side walls 116, 116 when said cross pieces are laid over the top board 118 as clearly shown in Figure 22.

The cheese press indicated generally at 12 in Figures 1 and 2, and in detail in Figures 25 and 26, is designed to receive a plurality of molds 104 each containing individual cheese blocks. The press has a framework including corner uprights 120, 120, a base 121 and a top plate 122. In the form shown in Figure 26, said framework has two similar press units mounted thereon, one of which is shown in raised, inoperative position, and the other of which is in lowered, pressing position.

Each press unit includes a plurality of upright guide bars 125, 125, on which are slidably mounted a series of superimposed plates 126, 126. Means are provided for maintaining all of said plates in exact parallel relation with each other at all times, as herein shown, said plates having elongated collars 127, 127 secured thereto which slidably engage each of the guide bars 125. A pressing member 128 of substantial weight is mounted above the topmost plate 126, said member herein consisting of a pair of relatively heavy plates 129, 129 connected by I-beams 130, 130.

The several plates 126 and the pressing member 128 are arranged so that the individual cheese molds 104 may be inserted between each adjacent pair of plates, and between the topmost plate and said pressing member, as illustrated in the press unit appearing on the left side of the apparatus shown in Figure 26. In this position the superimposed weight of the apparatus is exerted with increasing pressure upon the several cheeses stacked in the press as shown. Although the pressure on the cheeses near the bottom will be somewhat greater than those near the top, it will be understood that in practice it is usually desirable to turn or invert the cheeses several times during the pressing operation. Each time this is done, the cheesemaker may transpose or rotate the relative positions of the several cheeses so as to expose them all to substantially equal total pressures during the pressing operation.

I also provide means for elevating the pressing member 128 and the plates 126 so as to facilitate the insertion and removal of the cheese molds. In the form shown, each pressing member is connected by an upright link 135 to a horizontally disposed bar 136 which is pivoted at one end to a swinging supporting link 137. The free end of the bar 136 may be raised by suitable means, as for instance by a cable 138 passing over an overhead pulley 139.

The plates 126 are also loosely connected to each other and to the pressing member 128 by limited lost-motion means, herein consisting of a series of upright bolts 140, 140 passing loosely through each adjacent pair of plates, as best seen in Figure 25. Said bolts have heads or nuts at their opposite ends arranged so that each adjacent pair of plates can only be separated a limited distance. The pressing element 128 and the topmost plate 126 are also connected by similar bolts. Thus, when the pressing element is raised, all of the plates are also raised and partially separated from each other a distance sufficient to permit the mold boxes to be inserted in or removed from between the plates.

With the construction of the cheese press hereinabove described, the plates 126 will be maintained in exactly parallel relation with each other at all times, so that when the cheese blocks are removed from the press and taken out of their molds they will be of substantially uniform length, width and thickness, with their upper and lower planes parallel throughout their length.

The molded cheeses are then treated in the usual manner, as for instance, with salt or brine, and placed in the curing room until they are ready for cutting. The fact that the cheeses are handled while in relatively large portions renders all the handling of the cheeses easier and quicker, as two men can readily handle and turn each cheese between two boards or shelves, as required.

After the cheese is cured, it is cut into the proper size or portion for commercial use. Where the weight of each portion must be accurate as represented on the label, as for instance in the case of small portions of three to five ounces, each cheese block must be cut into smaller loaves, each of which must weigh the total weight of all the portions into which it will be subdivided. Thus if six five-ounce portions are to be cut, a loaf will be formed which weighs 30 ounces. It is then easy to determine the ratio height of the cheese to the width of the loaf. These determinations are greatly simplified when the large cheese blocks are maintained of uniform height and width, as is made possible by the improved methods of cutting, molding and pressing the cheese heretofore described. In cutting such small portions from a large cheese, it is usually desirable to eliminate most of the rind, as for instance at both ends and along the sides of the cheese block, but to leave at least some of the rind, as for instance on the larger top and bottom surfaces, so that each individual portion will have rind on at least one side, by which the consumer can identify the natural cheese.

The small cheese portions are finally packed by applying tinfoil on all freshly cut sides, and if desired, also to cover the rind. The rind side may either be paraffined in the usual manner, or left in its natural unparaffined state, in which case a relatively porous material such as thin cloth or paper will be used to cover it, so that the cheese may be given proper ventilation through the rind surface, thereby preventing the growth of anaerobic or putrefactive bacteria on the rind.

It will be understood that the cheese blocks may also be cut in many other shapes and sizes, as for instance when it is not essential that each loaf or portion must measure up to a certain standard of weight. Nevertheless the manufacture of the cheese with the use of my improved apparatus in which the several blocks are of relatively large but substantially of uniform size and weight, results in minimizing the losses due to removal of the rind, since it is only necessary to remove the rind at both ends of a large cheese block instead of removing the rind from the several sides of relatively smaller blocks of cheese, as usually made with previous methods of cheese manufacture.

Having described the above apparatus for cheese-making, the following advantages will now be apparent:

The improved form of whey strainer and top screen employed in the cheese vat expedites the drainage of free whey, but whatever is not removed from the top of the screen as surface whey is removed automatically later in the molding vat through the double porous bottom and from above the pressing plate.

This special molding vat wherein the batch of curds may be pressed into a mass of uniform thickness, together with the provision of removable platforms, and the precise cutting means associated therewith, render it possible to make relatively large cheese blocks of substantially uniform size and shape, practically without touching the cheese by hand. I believe that the use of a molding vat, independent of the cheese vat, for the purposes described, is entirely new in the cheese-making industry.

There is much less handling of cheese required in the curing room, because the cheese is handled in relatively large blocks. Shrinkage is also reduced, because the larger the cheese the smaller the percentage of rind as compared to the total weight, and the less surface exposed to evaporation means less shrinkage from moisture loss.

Although I have illustrated and described certain embodiments of my invention, it will be understood that I do not wish to be limited to the exact construction shown and described, but that various changes and modifications may be made without departing from the spirit and scope of my invention as defined in the appended claims.

I claim:

1. Apparatus for making natural cheese which comprises a molding vat adapted to receive a batch of curds, a plurality of removable platforms of equal size, spaced above the bottom of said vat, and means for cutting the batch in said vat along vertical lines coincident with the margins of said platforms, to form blocks of cheese of substantially equal size and shape so that they may be removed from the vat while supported separately on said platforms.

2. Apparatus for making natural cheese which comprises a molding vat adapted to receive a batch of curds, a plurality of removable platforms of equal size spaced above the bottom and extending a full horizontal dimension of said vat, and means for cutting the batch in said vat along vertical lines coincident with the margins of said platforms to form blocks of cheese of substantially equal size and shape, so that they may be removed from the vat while supported separately on said platforms.

3. Apparatus for making natural cheese which comprises a molding vat adapted to receive a batch of curds, a plurality of removable platforms of equal size spaced above the bottom and extending a full horizontal dimension of said vat, and a pair of cutting knives, each as long as said platforms, having means cooperating with spaced guiding means on the sides of said vat for cutting the batch in said vat along vertical lines coincident with the margins of said platforms, to form blocks of cheese of substantially equal size and shape that are removable from the vat while supported separately on said platforms.

4. Apparatus for making natural cheese which comprises a molding vat adapted to receive a batch of curds, a removable end plate adapted to be placed in said vat in spaced relation to one wall thereof, a plurality of removable platforms of equal size spaced above the bottom and fitting in said vat at one side of said end plate, and means for cutting the batch in said vat along vertical lines coincident with the margins of said platforms to form blocks of cheese of substantially equal size and shape, said end plate being arranged to be initially removed from the vat so as to afford access to the adjacent end platform, and thereby permit successive removal of the several platforms with separate cheese blocks thereon.

5. Apparatus for making natural cheese which comprises a molding vat adapted to receive a batch of curds, a removable end plate adapted to be placed in said vat in spaced relation to one wall thereof, a plurality of removable platforms of equal size spaced above the bottom and disposed parallel with and to one side of said end plate to form a double bottom portion, a perforated pressing plate having a continuous plane surface registering with said double bottom portion, and adapted to be applied to the top of the batch so as to express whey through said double bottom portion and its own perforations, and means for cutting the batch after the pressing plate has been removed along lines coincident with the margins of said platforms to form blocks of cheese of substantially equal size and shape, said end plate being arranged to be initially removed from the vat so as to afford access to the adjacent end platform, and thereby permit successive removal of the several platforms with separate cheese blocks thereon.

6. Apparatus for making natural cheese which comprises a molding vat adapted to receive a batch of curds, a plurality of perforated removable platforms of equal size spaced above the bottom of said vat, and means for cutting the batch in said vat along equally spaced vertical lines to form blocks of cheese of such size and shape that they may be individually supported on said platforms for removal from the vat.

7. Apparatus for making natural cheese which comprises a molding vat adapted to receive a batch of curds, a plurality of removable platforms of equal size spaced above the bottom and extending a horizontal dimension above said vat, a pair of cutting knives each as long as said platforms, and spaced guiding means on the sides of said vat co-operating with said knives for cutting the batch in said vat along vertical lines to form blocks of cheese of such size and shape that they may be individually supported on said platforms for removal from the vat.

8. Apparatus for making natural cheese which comprises a molding vat adapted to receive a batch of curds, a permeable curd-supporting platform adjacent the bottom of said vat consisting of a plurality of individually removable platform sections extending transversely of said vat and adapted to permit drainage of whey from the bottom of the batch, and means for cutting the batch in said vat along vertical lines extending in the same general direction as the individual platform members to form blocks of cheese of substantially equal size and shape, whereby said blocks may be independently removed from said vat.

9. Apparatus for making natural cheese which comprises a molding vat adapted to receive a batch of curds, a permeable curd-supporting platform adjacent the bottom of said vat consisting of a plurality of individually removable platform sections extending a full horizontal dimension of said vat and adapted to permit drainage of whey from the bottom of the batch, and a pair of cutting knives, each as long as said platform sections, having means co-operating with spaced guiding means on the sides of said vat for cutting the batch along equispaced vertical lines to form blocks of cheese of substantially equal size and shape that are removable from the vat while supported separately on one of said platform sections.

10. Apparatus for making natural cheese which comprises a molding vat adapted to receive a batch of curds, a removable end plate adapted to be placed in said vat in spaced relation to one wall thereof, a permeable curd-supporting platform adjacent the bottom of said vat consisting of a plurality of individually removable platform sections fitting in said vat at one side of said end plate and adapted to permit drainage of whey from the bottom of the batch, and means for cutting the batch in said vat along vertical lines parallel with said removable end plate to form blocks of cheese of substantially equal size and shape, said end plate being arranged to be initially removed from the vat so as to afford access to the adjacent end platform section and thereby permit successive removal of the several platform sections with separate cheese blocks supported thereon.

11. Apparatus for making natural cheese which comprises a molding vat adapted to receive a batch of curds, a removable end plate adapted to be placed in said vat in spaced relation to one wall thereof, a permeable curd-supporting platform adjacent the bottom of said vat consisting of a plurality of individually removable platform sections fitting in said vat at one side of said end plate and adapted to permit drainage of whey from the bottom of the batch, a perforated pressing plate having a continuous plane surface registering with said curd-supporting platform and adapted to be applied to the top of the batch so as to express whey through said platform and its own perforations, and means for cutting the batch after the pressing plate has been removed along vertical lines parallel with said end plate to form blocks of cheese of substantially equal size and shape, said end plate being arranged to be initially removed from the vat so as to form access to the adjacent end platform section and thereby permitting successive removal of the cheese blocks while supported on a separate platform section in the bottom of said vat.

RAYMOND MIOLLIS.